Patented Oct. 12, 1937

2,095,548

UNITED STATES PATENT OFFICE 2,095,548

HYDROGENATED PHENANTHRENE HOMOLOGS

Torsten Hasselstrom, New York, N. Y., and Washington Hull, Savannah, Ga.

No Drawing. Application April 19, 1933, Serial No. 666,821

11 Claims. (Cl. 260—167)

The present invention relates to hydrogenated phenanthrene homologs and, more particularly, to a process of catalytic hydrogenation of neutral rosin oils, neutral wood tar oil, abietenes, retenes, homologous or related hydrocarbons and to products resulting therefrom.

It is well known that in the manufacture of rosin oil by the destructive distillation of rosin or of wood tar by the destructive distillation of coniferous woods, there are formed abietene, retene, hydroretenes, and their homologs and analogs. The neutral portion of both rosin oil and of wood tar oil consists mainly of these hydrocarbons, which are unsaturated and unstable to light or air, so that the neutral portion of rosin oil or of wood tar is usually yellow or brownish. Various attempts have been made to improve the qualities and properties of the aforesaid hydrocarbons, but, as far as we are aware, none of the proposals has been wholly satisfactory and successful.

We have discovered that when the aforesaid neutral oils are hydrogenated catalytically by our process, the resulting hydrogenated oils are far superior to the unhydrogenated ones due to the fact they are colorless and stable to both air and light and suitable for many uses for which the latter are not.

It is an object of the present invention to provide hydrogenated phenanthrene homologs.

A further object of the invention is to provide new articles of manufacture termed hexahydroabietine and octahydroretene, respectively.

It is within the contemplation of the invention to provide a process of hydrogenating abietene, retene, neutral rosin oils, neutral coniferous wood tar oils or their derivatives, homologs or analogs in the presence of a catalyst especially one containing a metal of Group VIII of the Periodic System.

Other objects and advantages will become apparent from the following description of the invention.

Neutral rosin oil consists mainly of hydrocarbons resulting from the loss of carbon dioxide from the rosin acids. Since the rosin acids in ordinary rosin are mainly of abietic or pimaric type, the resulting abietenes in neutral rosin oil are mainly of abietic type (containing the retene nucleus) or of pimaric type (containing the pimanthrene nucleus), the former predominating, since dehydrogenation of rosin oil gives mainly retene.

The specific gravity of neutral rosin oil at 20° C. is approximately 0.89–0.99, 60–90% of the oil distills below 375° C. and the analysis shows that carbon is approximately 88.0% by weight and hydrogen is 11.3%.

Neutral pine wood tar oil, after removal of acids and phenols, contains mainly abietenes, abietines, and their degradation products, i. e. retene and hydroretenes, as shown by the dehydrogenation of neutral pine wood tar. Neutral pine wood tar oil has a specific gravity at 20° C. of about 0.89–1.13, 60–90% of the tar distills below 400° C. and the analysis shows that carbon is about 89.88% by weight and hydrogen is about 9.56%.

Neutral rosin oil and neutral pine wood tar oil are closely related, since both are composed mainly of mixtures of retene, retene homologs and analogs, abietene, and their hydroderivatives (abietines, etc.).

Our process comprises hydrogenating abietene, hydrogenated abietenes and/or degenerated abietenes (i. e. retene and hydroretenes). The neutral oils are hydrogenated in the presence of a suitable catalyst, which is preferably a metal of Group VIII of the Periodic System such as iron, cobalt, nickel, ruthenium, rhodium, palladium, osmium, iridium and/or platinum. The catalyst may be used with or without a catalyst carrier, such as kieselguhr, asbestos and the like. Hydrogenation can be completed in one step or in several or by batch or continuous operations. The neutral oils may preferably be distilled over sodium before hydrogenating. In practice, the sodium operation may be omitted.

For the purpose of giving those skilled in the art a better understanding of the invention, the following specific and illustrative examples will be given:

Example No. 1

About 128 grams of neutral rosin oil were hydrogenated for about 10 hours at about 1500–2500 lbs. per sq. inch pressure in the presence of about 2 grams of nickel-kieselguhr catalyst at about 175–185° C. The rosin oil before hydrogenation had the following properties:—a boiling point of about 351–358° C. at atmospheric pressure, a density $$(D_{20}^{20})$$

of about 0.9704, a refractive index $$(n_D^{20})$$

of about 1.53297 and a corresponding optical rotation of about +95.4°, about 88.55% by weight of carbon and about 11.69% of hydrogen, and a yield of about 122 grams of product were obtained. The product possessed the following properties: a boiling point of about 353–362° C. at atmospheric pressure, a density $(D_{20}^{20})$ of about 0.9444, a refractive index $(n_D^{20})$ of about 1.50605 and a corresponding optical rotation of practically zero; a carbon content equal to about 86.75% by weight and a content of hydrogen equal to about 13.32%. Theoretical calculations gave the formula of the product as $C_{19}H_{34}$ hexahydroabietine, with carbon as 87.0% by weight and hydrogen 13.0%, which product is a fully saturated hydrocarbon. As far as we are aware, this is the first time hexahydroabietine has been produced.

*Example No. 2*

About 150 grams of neutral pine wood tar oil were hydrogenated for about 11 hours at about 750–2500 lbs. per sq. inch pressure in the presence of about 4 grams of nickel-kieselguhr catalyst at about 175–195° C. The pine wood tar before hydrogenation had the following properties:— a boiling point of about 325–360° C., a density $(D_{20}^{20})$ of about 1.0097, a refractive index $(n_D^{20})$ of about 1.58544, a carbon content of about 89.88% by weight, a hydrogen content of about 9.56%. A yield of about 148 grams of product was obtained. The product possessed the following properties: a boiling point of about 315–340° C., a density $(D_{20}^{20})$ of about 0.9699, a refractive index $(n_D^{20})$ of about 1.54175; a carbon content equal to about 88.70% by weight and a hydrogen content equal to about 11.25%.

The hydrogenation can be carried out in one or several steps. Retene can be hydrogenated in the foregoing manner to produce an octahydroretene which is not the same as the octahydroretene obtained by Virtanen (Ber., 53, 1887 (1920)) from retent and hydriodic acid. Similarly, abietenes or hydro-abietenes yield by our process the new product hexahydroabietine.

It is to be observed that the present invention provides a new article of manufacture which is a fully hydrogenated phenanthrene homolog or a neutral hydrocarbon containing essentially fully hydrogenated abietene and fully hydrogenated abietine. The new product is a fully saturated hydrocarbon product and consists mainly of tetrahydro-abietene or perhydroabietene having an elemental composition corresponding to a formula of $C_{19}H_{34}$. There are many tests which are capable of clearly distinguishing between the new product and prior products. The more important of these tests are the following:—When the new product is subjected to the action of concentrated sulfuric acid under atmospheric conditions, practically no sulfonation occurs, whereas, if the same test is applied to prior products sulfonation occurs and sulfonated products result. A more severe test is the application of a mixture of concentrated sulfuric acid and fuming nitric acid (preferably 3:1 by volume) to our product which is practically unaffected and evolves no heat, whereas if this acid mixture is applied to prior products a violent reaction occurs and the oil is discolored and becomes brown, red, orange, etc. with the evolution of considerable heat. Furthermore, when the present product is exposed to air and light in a glass bottle for a relatively short period of time, the oil remains colorless and stable, whereas prior products became discolored and turned a yellowish to a brownish color. When the optical properties of the new oil are tested, it is found that the optical rotation is zero or practically zero. On the other hand, if prior products are tested it will be found that the optical rotation is comparatively high. In some cases, it has been stated that the optical rotation of prior products is usually about the same as that of the particular material from which it is derived.

When a catalyst is employed in the process, activators, promoters and/or co-catalysts may be used in conjunction therewith. For instance, copper, magnesium, cerium, tungsten, molybdenum or their equivalents may be used in the form of powdered metal, of compounds, of oxides, of salts, etc.

Although the present invention has been described in connection with certain specific and illustrative embodiments, it is to be observed that modifications and variations may be resorted to by those skilled in the art without departing from the spirit and scope of the invention as defined by the appended claims. Thus, temperatures of about 140° C., 175° C., 185° C., 195° C., and 250° C. may be used. Similarly, pressures of 1500 lbs. per square inch or more and 2000, 2500, 2800 or 6000 lbs. per square inch may be used.

We claim:—

1. The process which comprises fully saturating with hydrogen a neutral hydrocarbon oil consisting essentially of abietene ($C_{19}H_{30}$) and abietine ($C_{19}H_{28}$) in a liquid state in the presence of a hydrogenation catalyst containing essentially a metal of Group VIII of the Periodic System under pressure in excess of about 1500 lbs. per square inch and at a temperature of at least 140° C., and continuing the aforesaid hydrogenation to cause the absorption of more than four atoms of hydrogen per average molecule of abietene-abietine-containing material and to fully saturate practically all unsaturated hydrocarbons.

2. The process of producing fully saturated phenanthrene homologs composed principally of tetrahydro abietene which comprises fully hydrogenating a liquid containing essentially abietene ($C_{19}H_{30}$) and abietine ($C_{19}H_{28}$) in the presence of a hydrogenation catalyst containing a metal of Group VIII of the Periodic System under a pressure in excess of about 1500 lbs. per square inch and up to about 6000 lbs. per square inch at a temperature of about 140° C. to about 250° C., and continuing the aforesaid hydrogenation to cause the absorption of more than four atoms of hydrogen per average molecule of abieteneabietine-containing material and to fully saturate practically all unsaturated hydrocarbons.

3. The process of producing fully saturated phenanthrene homologs composed principally of hexahydroabietine ($C_{19}H_{34}$) which comprises fully hydrogenating a neutral hydrocarbon oil consisting essentially of abietene ($C_{19}H_{30}$) and abietine ($C_{19}H_{28}$) and having a boiling point within a range of about 200° C. to about 400° C.

in the presence of a hydrogenation catalyst containing essentially nickel under pressures of at least 2000 lbs. per square inch, and at a temperature of at least 140° C., and continuing the aforesaid hydrogenation to cause the absorption of more than four atoms of hydrogen per average molecule of abietene-abietine-containing material and to fully saturate practically all unsaturated hydrocarbons.

4. The process of producing fully saturated phenanthrene homologs composed principally of hexahydroabietine ($C_{19}H_{34}$) which comprises hydrogenating a neutral hydrocarbon oil consisting essentially of abietene ($C_{19}H_{30}$) and abietine ($C_{19}H_{28}$) and having a boiling point within a range of about 325° C. to about 360° C. in the presence of a hydrogenation catalyst containing essentially nickel under pressures of at least 2000 lbs. per square inch and at a temperature of at least about 140° C., and continuing said hydrogenation until the abietene-abietine-containing materials are fully saturated whereby hexahydroabietine ($C_{19}H_{34}$) is produced.

5. The process of producing fully saturated phenanthrene homologs composed principally of hexahydroabietine ($C_{19}H_{34}$) which comprises hydrogenating a neutral rosin oil consisting essentially of abietene ($C_{19}H_{30}$) and abietine ($C_{19}H_{28}$) and having a boiling point within a range of about 325° C. to about 360° C. in the presence of a hydrogenation catalyst containing essentially nickel under pressures in excess of about 1500 lbs. per square inch to about 6000 lbs. per square inch and at a temperature of about 140° C. to about 250° C., and continuing said hydrogenation until the abietene-abietine-containing materials are fully saturated whereby hexahydroabietine ($C_{19}H_{34}$) is produced.

6. The process of producing fully saturated phenanthrene homologs composed principally of hexahydroabietine ($C_{19}H_{34}$) which comprises fully hydrogenating a liquid containing essentially abietene ($C_{19}H_{30}$) and abietine ($C_{19}H_{28}$) in the presence of a hydrogenation catalyst containing a metal of group VIII of the Periodic System under a pressure of at least 1500 lbs. per square inch and at a temperature of at least about 140° C. and continuing the aforesaid hydrogenation to cause the absorption of more than four atoms of hydrogen per average molecule of abietene-abietine-containing material and to fully saturate practically all unsaturated hydrocarbons.

7. The process of producing fully saturated phenanthrene homologs composed principally of hexahydroabietine ($C_{19}H_{34}$) which comprises fully hydrogenating a neutral hydrocarbon oil consisting essentially of abietene ($C_{19}H_{30}$) and abietine ($C_{19}H_{28}$) and having a boiling point within a range of about 200° C. to about 400° C. in the presence of a hydrogenation catalyst containing essentially nickel under pressures of at least 2000 lbs. per square inch while at a temperature of about 140° C. to about 250° C., and continuing the aforesaid hydrogenation to cause the absorption of more than four atoms of hydrogen per average molecule of abietene-abietine-containing material and to fully saturate practically all unsaturated hydrocarbons.

8. The process of producing fully saturated phenanthrene homologs composed principally of hexahydroabietine ($C_{19}H_{34}$) which comprises hydrogenating a neutral rosin oil consisting essentially of abietene ($C_{19}H_{30}$) and abietine ($C_{19}H_{28}$) and having a boiling point within a range of about 325° C. to about 360° C. in the presence of a hydrogenation catalyst containing essentially nickel under pressures of at least about 1500 lbs. per square inch to about 6000 lbs. per square inch while at a temperature of about 175° C. to about 195° C., and continuing said hydrogenation until the abietene-abietine-containing materials are fully saturated whereby hexahydroabietine ($C_{19}H_{34}$) is produced.

9. As a new article of manufacture, a fully saturated phenanthrene homolog comprising essentially hexahydroabietine ($C_{19}H_{34}$), said hexahydroabietine being fully saturated with hydrogen.

10. As a new article of manufacture, a fully saturated phenanthrene homolog comprising essentially hexahydroabietine ($C_{19}H_{34}$), said hexahydroabietine being fully saturated with hydrogen, and said hexahydroabietine having a boiling point of about 350° C. to about 360° C., a density $$(D_{20}^{20})$$

of about 0.9444, a refractive index $$(n_D^{20})$$

of about 1.50605, and having an elemental composition corresponding to the molecular formula $C_{19}H_{34}$.

11. The process of producing a fully saturated phenanthrene homolog composed principally of hexahydroabietine ($C_{19}H_{34}$) which comprises hydrogenating a neutral rosin oil consisting essentially of abietene ($C_{19}H_{30}$) and abietine ($C_{19}H_{28}$) and having a boiling range of about 350° C. to about 360° C. under atmospheric conditions, a density $$(D_{20}^{20})$$

of about 0.97, and a refractive index $$(n_D^{20})$$

of about 1.53, in the presence of a hydrogenating catalyst containing essentially nickel, maintaining a pressure of about 2000 to about 6000 pounds per square inch and a temperature of about 200° C. to about 250° C., and continuing the hydrogenation until the oil is fully saturated whereby a product composed essentially of hexahydroabietine ($C_{19}H_{34}$) is produced having a boiling range of about 350° C. to about 360° C., a density $$(D_{20}^{20})$$

of about 0.9444, and a refractive index $$(n_D^{20})$$

of about 1.50605.

TORSTEN HASSELSTROM.
WASHINGTON HULL.